April 28, 1925.　　　　　　　　　　　　　　　　　　1,535,145

F. A. BOND

VEHICLE BUMPER

Filed Feb. 9, 1924

INVENTOR

Frank A. Bond,
By Kay, Totten & Brown,
Attorneys

Patented Apr. 28, 1925.

1,535,145

UNITED STATES PATENT OFFICE.

FRANK A. BOND, OF PITTSBURGH, PENNSYLVANIA, ASSIGNOR TO UNITED STATES CHAIN & FORGING COMPANY, OF PITTSBURGH, PENNSYLVANIA, A CORPORATION OF DELAWARE.

VEHICLE BUMPER.

Application filed February 9, 1924. Serial No. 691,696.

*To all whom it may concern:*

Be it known, that I, FRANK A. BOND, a citizen of the United States, and resident of Pittsburgh, in the county of Allegheny and State of Pennsylvania, have invented a new and useful Improvement in Vehicle Bumpers, and I do hereby declare the following to be a full, clear, and exact description thereof.

My invention relates to bumpers for vehicles, and more particularly to protective device designed to be mounted at the forward and rear ends of automobiles to absorb and resist the impact of collisions.

One of the objects of my invention is to provide a bumper structure having its greatest yielding capacity at points transversely of the vehicle where impacts are most likely to be received.

Another object is to simplify and improve the effectiveness of bumpers of the type referred to.

Figure 1:
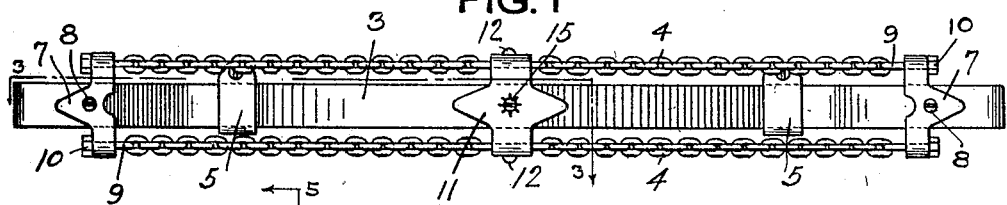
Figure 2:
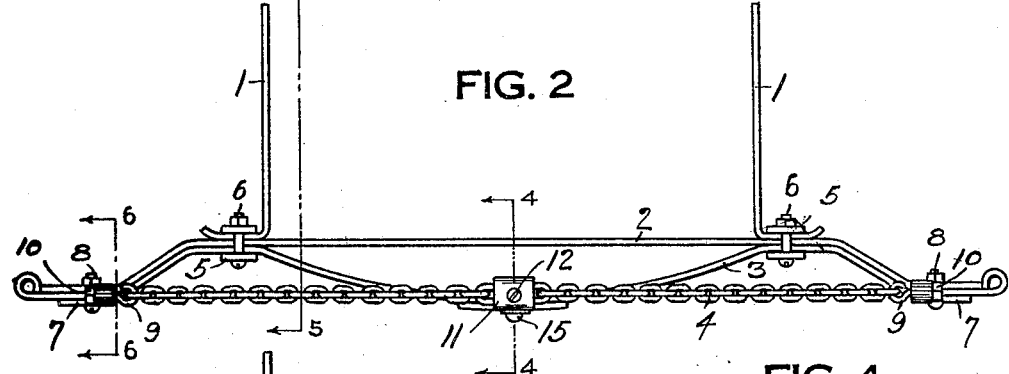
Figure 3:
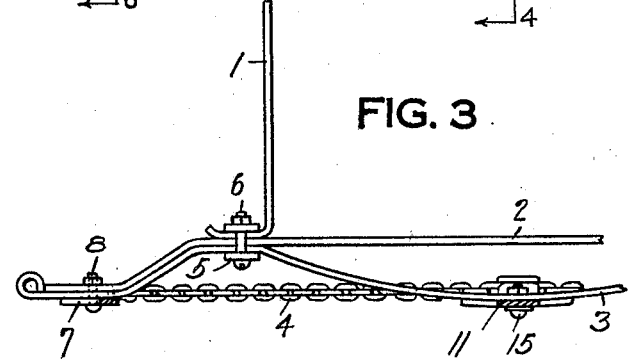
Figure 4:
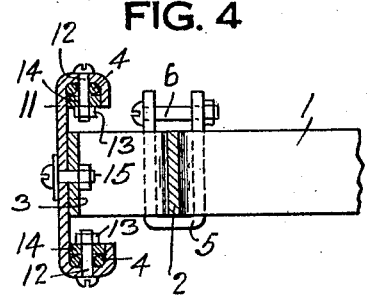
Figure 5:
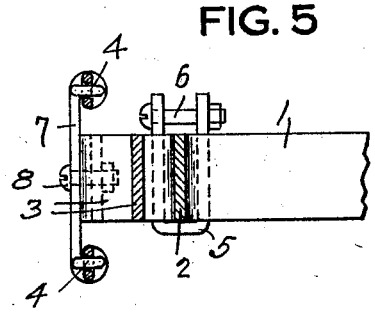
Figure 6:
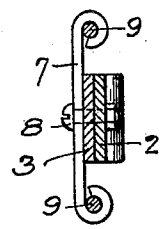

One form which my invention may take is shown in the accompanying drawing wherein Fig. 1 is a front elevational view of a bumper embodying my invention; Fig. 2 is a plan view thereof; Fig 3 is a view taken on the line 3—3 of Fig. 1; Fig. 4 is a vertical sectional view taken on the line 4—4 of Fig. 2; Fig. 5 is a similar view taken on the line 5—5 of Fig. 2, and Fig. 6 is a view taken on the line 6—6 of Fig. 2.

The bumper proper is supported in any desired manner from a vehicle, by means of forwardly extending bracket members 1 and comprises a truss member 2, an arch bar or strut member 3, and a pair of chains 4, together with the various connections that will be hereinafter described.

The brackets 1 and bars 2 and 3, are rigidly secured together by means of yokes 5 and bolts 6. The outer ends of the bars 2 and 3 are bent forwardly as shown more clearly in Figs. 2 and 3 and are secured together by plates 7 and bolts 8. The upper and lower ends of the plates are provided with eye portions through which extend bolt members 9 provided at their outer ends with nuts 10. The inner ends of the portions 9 are provided with hooks for engaging the end links of the chain 4, the tension of the chains being adjusted by means of the nuts 10.

As shown more clearly in Fig. 4, the chains 4 lie within channels formed at the upper and lower edges of a bracket 11, the middle elongated link of each chain being clamped in said bracket by means of a bolt 12 and nut 13 that engages a clamping plate 14. The bracket 12 is secured to the bar 3 by means of a bolt 15. The connection between the chains 4 and the bracket 11 may be either rigid or loose.

Those portions of the chains intermediate the bracket members 11 and plates 7 are disposed across the fronts of the wheels of the vehicle to which the bumper is attached. It is well known that in collisions with vehicles or other objects, the impact is usually made at a point removed from the longitudinal center line of the vehicle. The chains and outer ends of the bars 2 and 3 are therefore in position to receive substantially all impacts. The chains being merely flexible and not resilient, transmit the impacts received against them to the resilient structure which consists principally of the outer ends of the bars 2 and 3. The middle portion of the bar 3 assists in giving rigidity to the portion of the bumper lying between the bracket members 1. The chains being spaced vertically provide a widened area for receiving impacts, with a view to affording greater protection by reducing the tendency of obstacles to ride over or under a single chain, or a resilient bar. The chains further may move vertically with any object with which they may be brought into engagement.

The extreme outer ends of the bars 2 and 3 are rigidly secured together and offer ample resistance to impacts received thereby either directly or indirectly through the chains 4. The bars 2 and 3 at points beyond the brackets 1 are subjected to great stresses, the greatest bending movements occurring adjacent to the extremities of the bracket members 1. The overlapping arrangement of the bars 2 and 3 at these points insures proper resistance to stresses imposed upon the outer ends of the bars while at the same time they may readily return to their original form after deflection.

From the foregoing description, it will be seen that I provide a structure wherein the yielding members are disposed at points transversely of the vehicle where impacts are most likely to take place, and one wherein the bumper structure is effectively braced against distortion either by thrusts in a sidewise direction, or by forces applied directly against its forward portion, substantially the entire flexing taking place beyond the transversely extending extremities of the bracket members 1.

Various changes in details and general arrangement may be made without departing from the spirit and scope of the invention as defined in the accompanying claims. For instance, it is not necessary that both the members 2 and 3 extend across the space between the bracket members 1, nor that they both extend beyond the yoke member 5, and other flexible tension members than the chains 4 may be employed.

What I claim is:

1. A bumper structure comprising supporting brackets, resilient bars supported by said brackets and having their ends extending past said brackets, the outer ends of said bars being bent forwardly, and a flexible tension device connecting the outer ends of said bars.

2. A bumper structure comprising supporting brackets, resilient bars supported by said brackets and having their ends extending past said brackets, the outer ends of said bars being bent forwardly, a flexible tension device connecting the outer ends of said bars, and means for supporting said tension device at an intermediate point against movement transversely of said bars.

3. A bumper structure comprising supporting brackets, resilient bars supported by said brackets and having their ends extending past said brackets, the outer ends of said bars being bent forwardly, a flexible tension device connecting the outer ends of said bars, and means for giving rigidity to those portions of said bars lying between the brackets 4. A bumper comprising a supporting structure provided with forwardly extending yielding members adjacent to its ends, means for providing a support at a point between said ends, and a tension device connecting said ends and secured to said support.

5. A bumper comprising a supporting structure provided with forwardly extending yielding members adjacent to its ends and a means for providing a support at a point between said ends, and vertically spaced tension devices connecting said ends and secured to said support.

6. A bumper comprising a truss bar and an arch bar of yielding material and having their ends disposed at an angle with respect to their intermediate portions, the arch bar being bowed at its intermediate portion, means for securing said bars together at each side of their intermediate portions, and a flexible tension device connecting the outer ends of said bars.

7. A bumper comprising a truss bar and an arch bar of yielding material and having their ends disposed at an angle with respect to their intermediate portions, the arch bar being bowed at its intermediate portion, means for securing said bars together at each side of their intermediate portions, and a flexible tension device connecting the outer ends of said bars, the said tension device being supported at its middle portion by said arch bar.

8. A bumper structure comprising a bar supported against flexure at points intermediate its ends and yieldable adjacent to its ends, and a flexible tension device for receiving impacts connecting the outer ends of said bar.

9. A bumper comprising a member yieldable adjacent to each end thereof, a support intermediate said ends, and a tension device connecting each of said ends to said support.

10. A bumper structure comprising a member yieldable adjacent to each end thereof, a flexible tension device connecting the ends of said member, and a support for the tension device intermediate its ends.

11. A bumper structure comprising a member yieldable adjacent to each end thereof, vertically spaced chains connecting the ends of said member, and a support for the said chains intermediate their ends.

12. A bumper comprising a truss bar and an arch bar of yielding material and having their ends disposed at an angle with respect to their intermediate portions, the arch bar being bowed at its intermediate portion, means for securing said bars together at each side of their intermediate portions, and a flexible tension device connecting the outer ends of said bars, the end portions of said bars having abutting engagement with each other.

In testimony whereof I, the said FRANK A. BOND, have hereunto set my hand.

FRANK A. BOND.